METHOD AND APPARATUS FOR PRODUCING RAPID BUILD-UP OF RADIO FREQUENCY OSCILLATIONS

Filed Jan. 23, 1943 4 Sheets-Sheet 1

Inventor:
Richard C. Jensen,
by Harry E. Dunham
His Attorney.

Feb. 21, 1950

R. C. JENSEN 2,498,495

METHOD AND APPARATUS FOR PRODUCING RAPID BUILD-UP OF RADIO FREQUENCY OSCILLATIONS

Filed Jan. 23, 1943

4 Sheets-Sheet 2

Inventor:
Richard C. Jensen,
by Harry E. Dunham
His Attorney.

Feb. 21, 1950 R. C. JENSEN 2,498,495

METHOD AND APPARATUS FOR PRODUCING RAPID BUILD-UP OF RADIO FREQUENCY OSCILLATIONS

Filed Jan. 23, 1943 4 Sheets-Sheet 3

Inventor:
Richard C. Jensen,
by Harry E. Dunham
His Attorney.

Inventor:
Richard C. Jensen,
by Harry E. Dunham
His Attorney.

Patented Feb. 21, 1950 2,498,495

UNITED STATES PATENT OFFICE 2,498,495

METHOD AND APPARATUS FOR PRODUCING RAPID BUILD-UP OF RADIO FREQUENCY OSCILLATIONS

Richard C. Jensen, Scotia, N. Y., assignor to General Electric Company, a corporation of New York Application January 23, 1943, Serial No. 473,279

13 Claims. (Cl. 343—13)

The present invention relates to radio locating equipment which in general comprises a transmitter for sending out directional pulses of radio waves, a receiver for echoes of the transmitted pulses (either from reflections or from pulse transmission equipment excited by the pulses), and equipment for coordinating the transmitter and receiver.

An object of my invention is to provide a simplified equipment in which the transmitter serves as a receiver during the intervals between transmitted pulses.

Another object of my invention is to provide improved circuits for controlling the pulsing of the transmitter and for increasing the efficiency of transmission and reception.

Still another object of my invention is to provide a high frequency pulsed oscillation generating system and method in which the time required for the build-up of oscillation in each pulse group is materially decreased.

A further object of my invention is to provide an improved pulse echo locating system incorporating an intermittently-pulsed local oscillator together with means for increasing the rate of build-up of oscillations therein in response to the receipt of an echo pulse, thereby to increase the reliability and accuracy of pulse indication.

Further objects will appear as the description proceeds.

Figure 1:
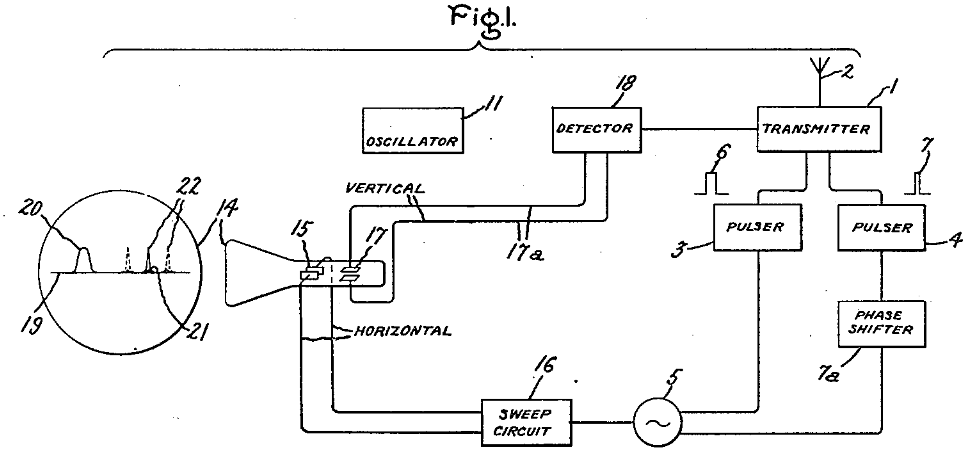
Figure 2:
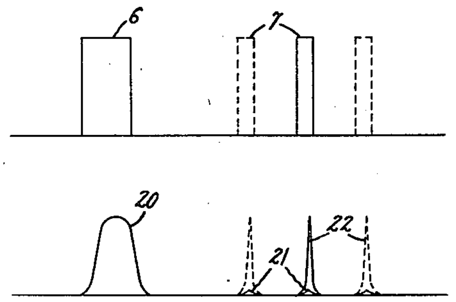
Figure 3:
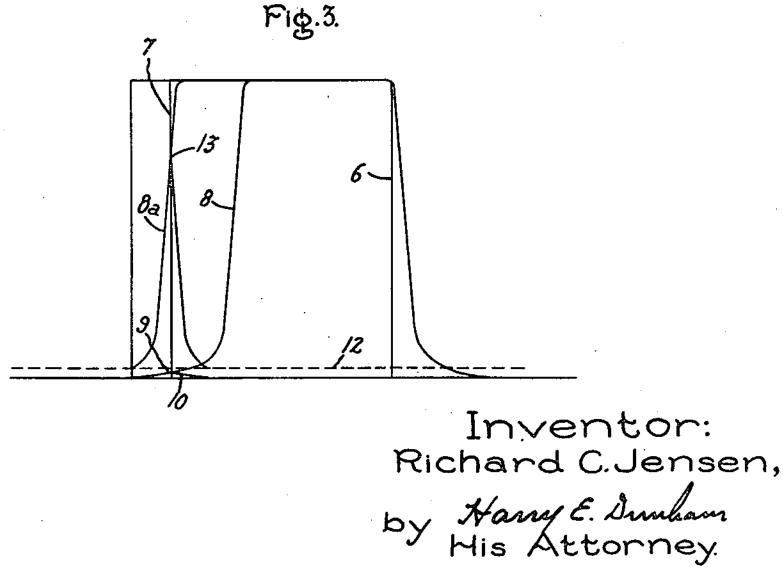
Figure 4:
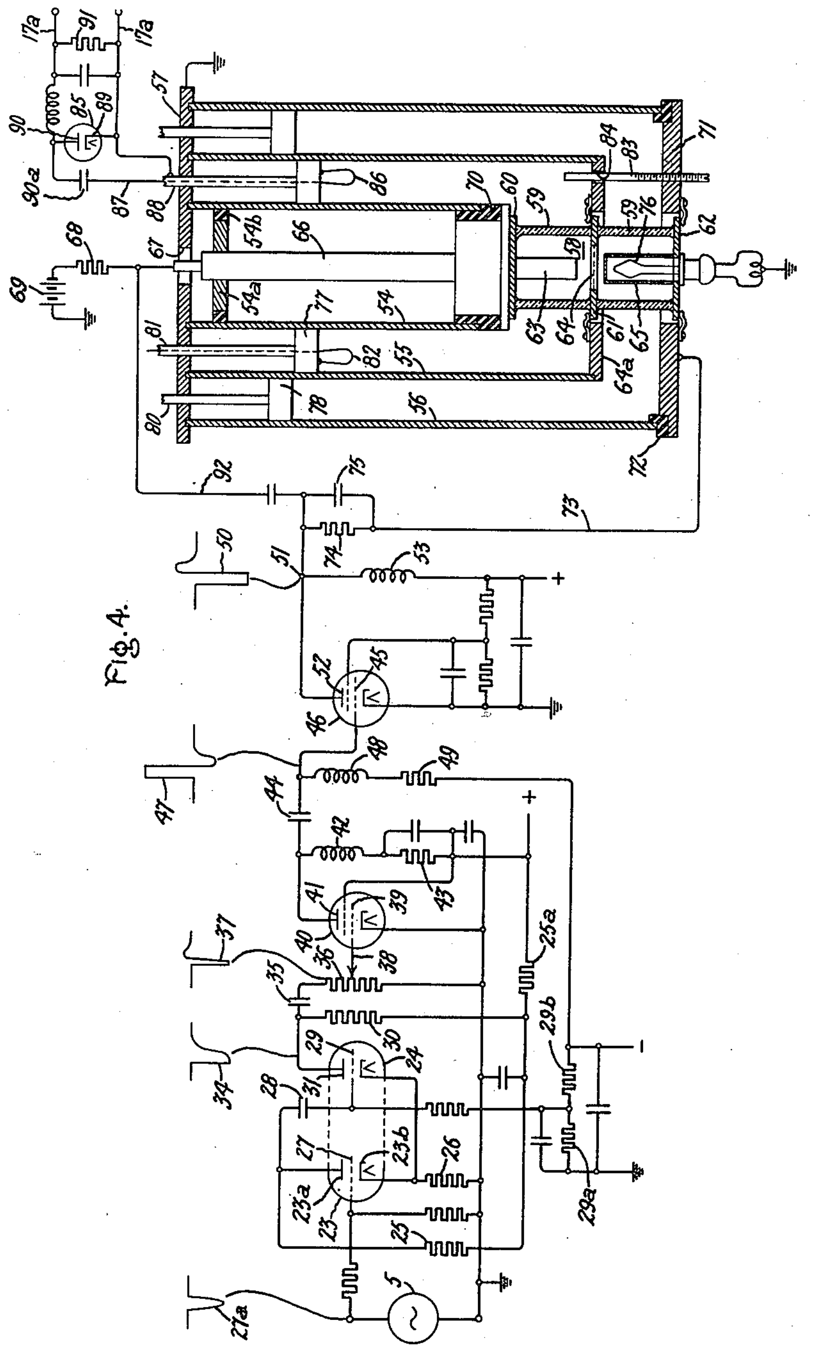
Figures 5, 6, 8:
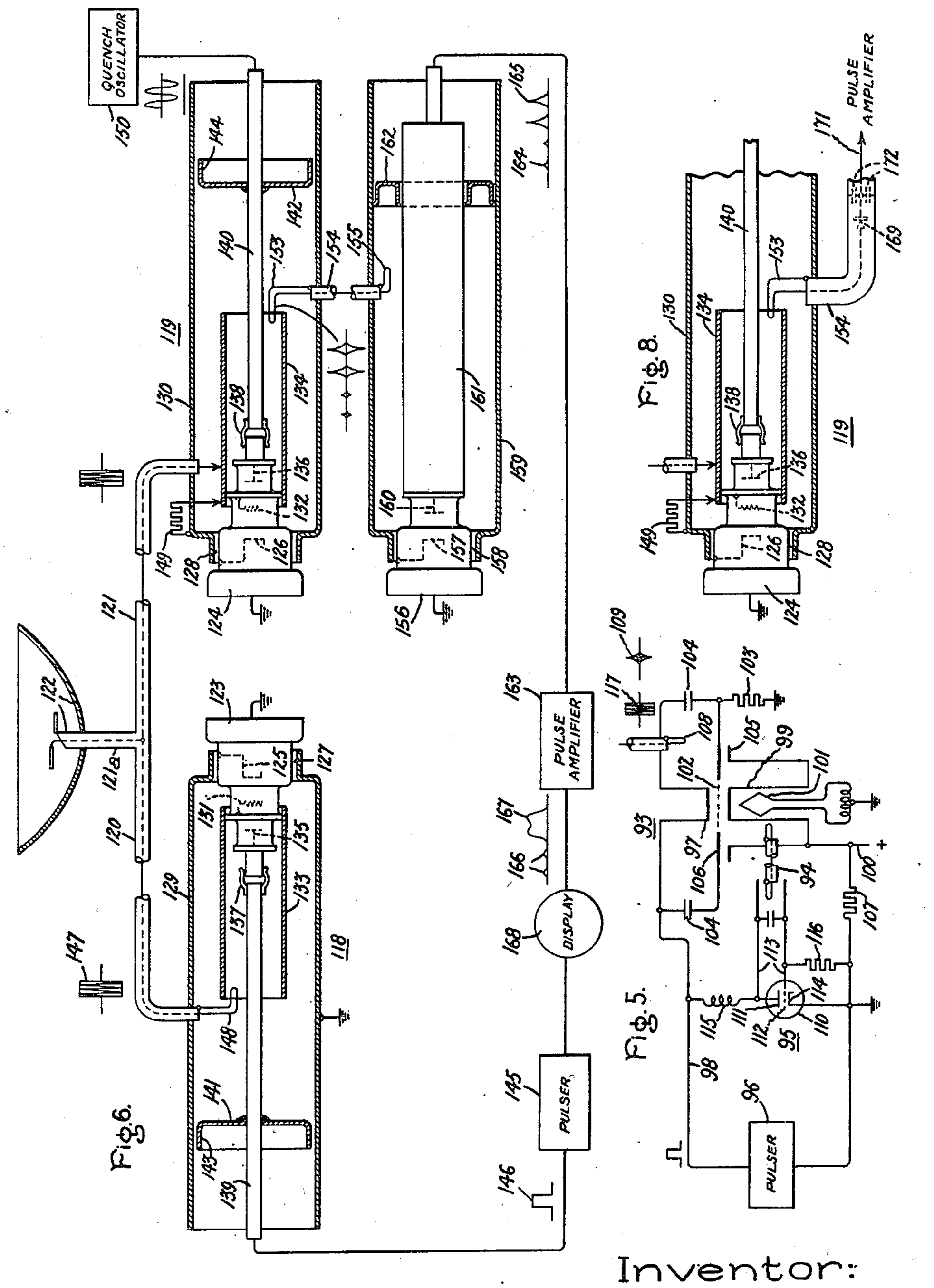
Figure 7:
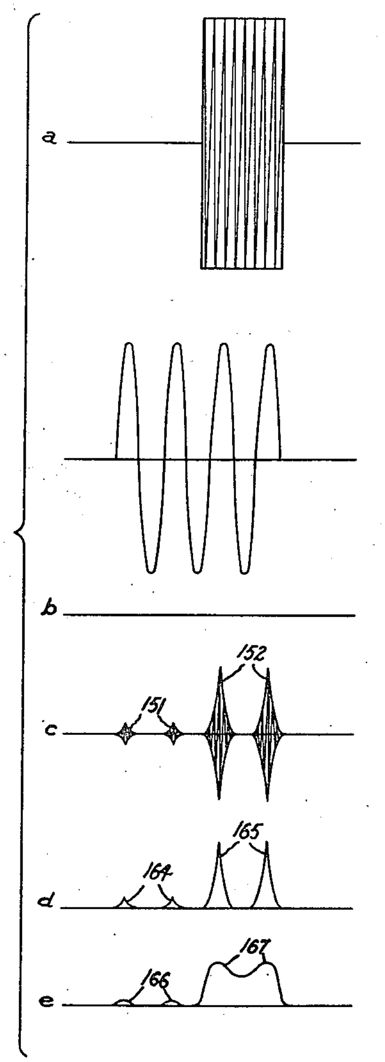
Figure 9:
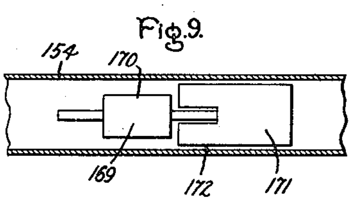
Figure 10:
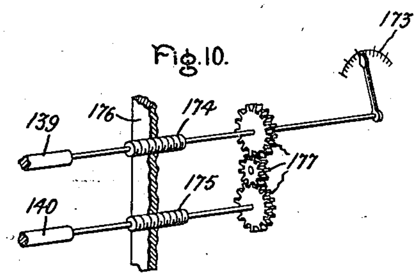

In the accompanying drawing, Fig. 1 is a schematic diagram of radio locating equipment embodying my invention; Figs. 2 and 3 illustrate operating characteristics; Fig. 4 is a circuit diagram; Fig. 5 shows a transmitter in which the rate of oscillation build-up is increased by the coincident pulsing of a priming oscillator; Fig. 6 shows an ultra high frequency radio locating equipment having a receiver in which the signal acts as the priming pulse; Fig. 7 illustrates the operation of Fig. 6; Fig. 8 is a modification of the detector; Fig. 9 is a detail view of the crystal used in the Fig. 8 detector; and Fig. 10 shows an arrangement for ganging the tuning of the transmitter and receiver.

Referring to Fig. 1 of the drawings there is schematically shown locating equipment having a 600 megacycle transmitter 1 which may be a cavity resonator of the construction shown in my joint application with James E. Keister, Serial No. 448,206, filed June 24, 1942, now Patent No. 2,427,558, granted September 16, 1947, connected to a directional antenna 2. The cavity resonator is controlled by pulsers 3 and 4 energized from a source of alternating voltage 5 and producing periodic square wave or pulse voltages indicated at 6 and 7. The pulse 6, as indicated by its width, lasts for a much longer interval than the pulse 7. Through a phase shifter 7a, the timing of the pulse 7 may be adjusted relative to the pulse 6 as shown in Fig. 2.

From tests on cavity resonators with pulse excitation, I have observed that the amplitude of oscillation builds up (and decays) exponentially and may take a relatively long time compared to the duration or length of the pulse voltage. The time of build-up can be decreased by increasing the magnitude of the pulse voltage and also by changing the design of the cavity so as to obtain a greater feedback.

The upper half of the characteristic oscillation envelope is shown in Fig. 3 with the pulse voltages 6 and 7 shown on the same time scale. While the oscillation builds up to its full value along the envelope 8 with the long or wide pulse voltage 6, with the shorter or narrow pulse 7, oscillation builds up only along the initial part of the envelope 8 to point 9, and from this point the oscillation decays along line 10.

I have found that rate of build-up and accordingly the sharpness of the pulse can be appreciably increased by coupling into the transmitter oscillator tank circuit a small radio frequency voltage resonant with the oscillator frequency. This small voltage may be obtained from an oscillator 11 coupled to the transmitter oscillator through its antenna 2. The effect of the small radio frequency voltage is to start the oscillation build-up at a higher level indicated by the dotted line 12. This effectively shifts the oscillation envelope to the left so the leading edge now follows the line 8a and the build-up time is approximately one third. While this makes a noticeable change in the oscillation with the pulse voltage 6, the most noticeable change is with the pulse voltage 7 which now causes the oscillation to build up along the line 8a to the sharp peak 13.

Fig. 3 is reproduced from tests on the cavity of my aforesaid joint application when pulsed at its normal operating voltage. In a cavity designed to have a shorter time of build-up at its normal operating voltage, the radio frequency voltage from the oscillator 11 produced a smaller change in the rate or time of build-up. However, when the latter cavity was pulsed at a lower voltage, at which the time of build-up was increased results proportionate to those indicated in Fig. 3 were obtained. From this I conclude that the priming effect of the radio frequency voltage from the oscillator 11 is more effective in oscillators having a relatively long time of build-up.

The more rapid build-up of the transmitter oscillation when excited by a weak radio frequency voltage is used to indicate the presence of an echo. When there is no echo during the pulse 7 the transmitter oscillates at the negligible level 9, 10. If an echo is received coincident with the pulse 7, the radio frequency voltage of the echo causes the oscillation to build up to the much higher level 13. By shifting the phase of the pulses 7 until the pulses coincide with an echo, a sensitive indication of the echo can be obtained. The sensitivity varies with the intensity level at which the oscillator is pulsed. For best results the pulse width (or voltage) should be such as to produce only slight occillation in the absence of a signal. The proper pulse width (or voltage) can be determined experimentally.

This has been demonstrated by supplying the transmitter with a weak signal from the oscillator 11, this signal being of substantially the strength of the echo from the transmitted pulses. During the tests the transmitting antenna 2 was a simple doublet coupled to the cavity, and the radiating antenna of the oscillator consisted of the terminals of the oscillator. This was done to simulate the effect of increased distance between the oscillator 11 and transmitter 1. The indication of the oscillation was obtained in a cathode ray tube 14 having horizontal plates 15 connected to a sweep circuit 16 energized from the alternating voltage source 5 and having its vertical plates 17 connected by conductors 17a to a diode detector 18 coupled to the radio frequency energy in the transmitter cavity. The sweep voltage between the horizontal plates produced a horizontal trace 19 on the screen of the cathode ray tube and the vertical plates produced deflections corresponding to the rectified envelope of the radio frequency oscillation of the transmitter.

With the oscillator 11 cut off, the transmitted pulses 20, corresponding to the pulse 6, were clearly observed but only small indications 21 were produced by the pulses 7.

By tuning the oscillator 11 to the same frequency as the transmitter it was observed that peaks 22 were obtained concident with the pulse voltages 7. When the oscillator was tuned above and below the transmitter frequency the peaks 22 disappeared and there remained only the much smaller peaks 21 due to the pulse voltage 7. As a further check the oscillator was tuned to subharmonics of the transmitter frequency so as to obtain a correspondingly weaker signal (higher harmonics of the oscillator) at the transmitter frequency. The same effects were observed indicating that the transmitter when energized by the pulse voltage 7 was a sensitive receiver.

The peaks 21 and 22 on the cathode ray screen not only showed a difference in the amplitude of oscillation, represented by the height of the peaks, but also showed a similar difference in power, represented by the areas under oscillation envelopes. This was checked by a lamp bulb in the radio frequency field which would light during the peaks 22 but not during the peaks 21. This provided a rough measure of the relative power under these conditions.

During all of these tests the angular position of the narrow pulse voltage 7 was changed by the phase shifter 7a as indicated by dotted lines in Fig. 2, and it was observed that the peak 22 always coincided with the pulse voltage.

It was not necessary that the oscillator be on continuously. The same effect was observed by pulsing the oscillator 11 immediately prior to the pulses 6 and 7. This was sufficient to couple a radio frequency voltage into transmitter during the initial period of the pulsing of the transmitter.

The shortening of the time of build-up also results in an increase in transmitter efficiency since plate current flows throughout the voltage pulse while the output does not become appreciable until the oscillation has built up. For a given length of voltage pulse, the coupling in of a small radio frequency voltage results in a greater output and a higher efficiency.

Fig. 4 is a circuit diagram of the transmitter 1, the detector 18 and of one of the pulsers 3 or 4 which converts the voltage of the alternating current source 5 from a more or less peaked wave form to square wave pulses of variable width for controlling the transmitter for transmission or reception.

The input of the pulser, which is fed from the alternating current source 5 either directly or through the phase shifter 7a, consists of a multivibrator having electron discharge devices 23 and 24 which may be within a single envelope. The device 23, which is normally conducting, has its anode 23a connected to the positive terminal of the power supply through resistances 25 and 25a and its cathode 23b connected to ground through resistance 26. While the device 23 is conducting, the anode voltage is less than the voltage of the power supply by the drop through the resistances 25 and 25a. The grid 27 of the device 23 is connected to the alternating voltage source 5 and is driven negatively during the peaks 27a, causing a decrease in the anode current with the resultant increase in anode voltage which is applied through a condenser 28 to the grid 29 of the tube 24.

The grid 29 has a negative bias obtained from a resistance 29a in series with a resistance 29b across a source of negative bias potential and maintains the device 24 nonconducting until the negative bias is overcome by the voltage from the anode 23a. At this point current flows through a resistance 30 to the device 24 and through the resistance 26. The voltage drop through the resistance 26 drives the grid of device 23 negative with respect to the cathode of that device, causing a rapid interruption of the current in the device 23 and a sudden increase in the current in the device 24. This results in a sudden drop in voltage at the anode 31 of the device 24 as shown at 34. As the condenser 28 is charged, the positive bias on the grid decreases and causes a decrease in the current in tube 24. The decreased current flowing through the resistance 26 renders the grid of device 23 positive with respect to the cathode, causing that device to become conducting, and the decrease in voltage at the anode 23a drives the grid of device 24 to cut-off. The decrease in current in the device 24 is accompanied by a rise in anode voltage which, as shown at 34, is not as rapid as the drop.

The negative dip in the voltage at the anode 31 has a wave shape determined by the regenerative build-up time of the device 24 and is independent of the wave shape of the alternating voltage supply 5, although a peaked wave shape will provide a more difinite starting point.

The output voltage of the device 24 is fed through a differentiating circuit consisting of a condenser 35 and a resistance 36 which causes a more sharply peaked voltage 37 to appear across the resistance 36. This peaked voltage is applied through a variable tap 38 to the grid 39 of a normally conducting electron discharge device 40 and at some value less than its maximum negative value drives it to cut-off. At cut-off the current flowing to the anode 41 through the inductance 42 and resistance 43 is interrupted and a transient voltage is induced in the inductance and is applied through a condenser 44 to the grid 45 of an electron discharge device 46 driving the device to saturation. The grid 45 has a negative bias, from its connection to the source of bias potential through an inductance 48 and resistance 49, which normally holds the device 46 at cut-off.

The voltage at the grid 45, shown at 47, rises abruptly to a peak limited by the grid current in the device 46 and lasts until the stored energy in the inductance 42 is dissipated in the grid 45 and the associated circuits. As the voltage drops, the voltage 37 becomes sufficiently positive to make the device 40 conducting and any negative transient is damped by the flow of current to the anode 41.

The duration or width of the pulse 47 is determined by the inductance 42, the negaitve bias on the grid 45, and the magnitude of the voltage applied to the grid 39 and could be changed by varying any of these factors. In the present circuit, the inductance 42 and the bias on the grid 45 are fixed so the pulse width is varied by the tap 38. As the tap 38 is moved toward the upper end of the resistance 36, the rate at which the device 40 is driven to cut-off increases, the amplitude of the transient voltage due to the energy stored in the inductance 42 increases, and the device 40 is held longer at cut-off. All of these factors tend to widen the pulse. Variations in pulse width of from 4 or 5 to 1 have been obtained.

The device 46 converts the positive pulse 47 to a negative pulse 50 at a terminal 51 connected to the anode 52 and through an inductance 53 to the power supply. Prior to the pulse 47, no current flows through the inductance 53 and the voltage at the terminal 51 is equal to the voltage of the power supply. At the pulse 47, the device 46 is driven to saturation connecting the terminal 51 to ground through the low impedance of the device. This results in a sudden decrease in voltage at the terminal 51. With a power supply voltage of 1,000 volts, the terminal voltage may drop to 100 volts, producing a negative pulse of 900 volts. At the end of the pulse 47, the device 46 is driven to cut-off and the voltage at the terminal rises above the power supply voltage due to the induced voltage in the inductance 53.

The above-described pulse-forming circuit of Fig. 4, comprising devices 23, 24, 40 and 46 and associated circuits, is particularly claimed in my divisional application, Serial No. 530,624, filed April 12, 1944, now Patent 2,440,547, granted April 27, 1948.

The negative pulses 50 appearing at the terminal 51 are used to control a cavity resonator of the construction shown in my aforesaid joint application Serial No. 448,206. It comprises concentric metal cylinders 54, 55 and 56 connected at the upper ends to a grounded metal disk 57 and having recessed in the lower ends an electron discharge device 58 having a glass envelope 59 from which project metal flanges 60, 61 and 62 respectively connected to the anode 63, grid 64, and cathode 65. The anode 63 is connected to a metal rod 66 which extends out through an opening 67 in the disk 57 and is connected through a resistance 68 to a high voltage direct current supply 69 which may be of the order of 10,000 volts. The anode flange is insulated from the lower end of the cylinder 54 by a dielectric bushing 70 which is an effective insulation for direct current but not for high frequency. For high frequency the anode flange is effectively connected to the cylinder 54. The grid flange 61 is directly connected by a metal disk 64*a* to the lower end of the cylinder 55 so that the grid is grounded. The cathode flange 62 is connected to a metal disk 71 which is insulated by a dielectric bushing 72 from the lower end of the cylinder 56. The dielectric bushing 72, like the bushing 70, is effective for direct current but not for high frequency. The cathode is connected by a conductor 73 through a biasing resistance 74 shunted by a by-pass condenser 75 to the terminal 51, which, during the intervals between the negative pulses 50, is maintained at a positive potential, for example 1,000 volts, sufficient to provide a bias which quickly damps any oscillation. The cathode is heated by bombardment from a grounded filament 76.

The cylinders 54, 55, 56 serve as concentric transmission lines which, as explained in my aforesaid application, when properly tuned serve as oscillatory circuits coupling the electrodes of the device 58. These circuits are tuned by metal short circuiting rings 77 and 78 respectively arranged between the cylinders 54 and 55, and 55 and 56, and slideable to the desired positions by rods 80 extending out through the grounded disk 57. The rods 80 for the ring 77 are not shown. The connection to the antenna 2 is through a concentric transmission line 81, the inner and outer conductors of which are connected to an adjustable loop 82 extending between the cylinders 54 and 55. The feed back coupling between the anode and grid is adjusted by means of a metal rod 83 threaded into the disk 71 and projecting through an opening 84 in the disk 64*a* into the space between the cylinders 54 and 55.

Under some circumstances I have observed that radio frequency energy is fed out through the rod 66. This is prevented in the present construction by an adjustable metal ring 54*a* slideable along the rod 66 and insulated from the cylinder 54 by an insulating ring 54*b*. The ring 54*a* cooperates with the cylinder 54 and the rod 66 to provide a quarter wave length transmission line which offers a high impedance to the outward flow of radio frequency energy. The energy which would flow out if the ring were omitted is fed back to the cylinder 54 through the capacity between the ring and cylinder.

The negative pulses 50 remove the positive bias on the cathode 65, permitting the building up of radio frequency oscillations in the cavity resonator for a length of time determined by the duration of the pulse. As explained above, the time of build-up may be shortened by coupling a small radio frequency voltage into the resonator, for example through the loop 82, which picks up energy from the oscillator 11 through the antenna 2.

During transmission, when a substantial output is desired so as to transmit pulses of radio frequency waves the tap 38 on the pulser is adjusted to provide the relatively long pulse indicated at 6 in Figs. 2 and 3. During reception the tap 38 is adjusted for shorter pulse 7 so that in the absence of any received signal coupled into the resonator the oscillations only build up to the negligible magnitude shown at 21 in Fig. 2. Upon coincidence of an echo with the shorter pulse 7 the radio frequency voltage of the echo coupled into the resonator causes the oscillation to build up to the high peak values indicated at 22 in Fig. 2. Due to the short interval between the pulses 6 and 7, I found it convenient to use two pulsers, as indicated in Fig. 1, one being adjusted for the wide pulse 6 and the other being adjusted for the narrow pulse. It would be possible to make the tubes 40 and 46 common to both pulsers.

While the use of a single pulse 7 for reception illustrates the operation, it is expected in actual practice that a large number of such pulses will be used so as to provide more complete coverage and that the phase shifting will be automatically controlled. It is obviously unnecessary that the received pulses 7 have the same voltage as the transmitted pulses 6. The same effect can be obtained by lower voltage pulses 7 having a duration such that an appreciable difference in the amplitude of the radio frequency oscillation (or of radio frequency current) is obtained with the coincidence of a received signal. From one aspect, the transmitter is excited at a high intensity level for transmission and at a low intensity level for reception.

The detector 18 consists of a diode 84 coupled to the oscillatory circuit by a loop 86 similar to the loop 82 between the tubes 54 and 55 and connected to inner and outer conductors 87 and 88 of a coaxial transmission line the outer conductor of which is connected to the ring 77. The outer conductor 88 is connected to the cathode 89 and the inner conductor 87 is connected through a condenser 90*a* to the anode 90 of the diode. The positive half of the radio frequency oscillation picked up by the loop 86 appears across the resistance 91 and is fed through conductors 17*a* to the vertical plates of the cathode ray tube.

Since the rectified radio frequency energy appears in the external conductors 73 and 92 it is possible, in accordance with the practice in super regenerative receivers, to couple these conductors to the cathode ray tube provided provisions are made to insulate from the high voltages in these conductors.

In Fig. 5 is conventionally represented a pulse transmitter having a cavity resonator 93 loosely coupled through a link 94 to a priming oscillator 95, both oscillators being pulsed by a source 96 of pulse voltages. The cavity resonator has an anode 97 connected through a conductor 98 to the high voltage terminal of the pulser, a cathode 99 connected to the positive terminal 100 of a source of bombardment voltage, and a grid 102 connected to ground through a grid leak 103. The negative terminal of the source of bombardment voltage is grounded and connected to a heater 101 from which the cathode 99 is heated by electron bombardment. In the walls of the anode-grid cavity are blocking condensers 104 which serve as insulation for direct current but not for high frequency. Flanges 105 on the cathode-grid cavity cooperate with a disk 106 connected to the grid to provide similar insulating or blocking condensers between the grid and cathode. The source of bombardment voltage 100 is connected through a resistance 107 to the grounded side of the pulser. In the diagrammatic representation the walls of the cavity resonator are shown integral with the associated electron discharge device although in actual practice the device would be a separate unit insertable into the cavity as in the previously described construction.

The priming oscillator 95 has an electron discharge device 110 having an anode 111 and a grid 112 connected to a resonant transmission line 113 and a cathode 114 connected to the grounded side of the pulser. The anode side of the transmission line is connected to the high voltage side of the pulser by a choke 115, and the grid side of the transmission line is connected to ground through a resistance 116. The priming oscillator is so designed that it oscillates at the same frequency as the cavity resonator 93 and so that its oscillation builds up very fast. The coupling loop 94 accordingly couples a resonant priming voltage into the cathode-grid cavity coincident with the pulsing of the cavity resonator.

When the cavity resonator is operated without the priming oscillator 95, the time of build-up is so long that the oscillation does not build up to its full amplitude during the driving pulse. The output pulses, picked up by a loop 108 in the anode grid cavity, are peaked, as indicated at 109. With the coincident priming voltage from the oscillator 95, the time of build-up is decreased so that flat topped output pulses 117 are obtained which are of substantially the same character as the driving pulses. The pulses 109 and 117 correspond respectively to the pulses 8 and 8*a* in Fig. 3. The priming oscillator, by increasing the rate of build-up, increases both the output and efficiency of the cavity resonator. The beneficial effects of the priming oscillator are obviously obtainable only in conjunction with oscillators having a relatively slow time of build-up.

In Fig. 6 is shown radio locating equipment having a 3000 megacycle transmitter 118 and a receiver 119 connected by concentric transmission lines 120 and 121 through a T 121*a* to antenna in a paraboloidal reflector 122. The transmitter and receiver are oscillators of the reentrant cavity type having lighthouse tubes 123 and 124 (similar to device 58 in Fig. 4) which are shown in elevation with the tube elements diagrammatically indicated in dotted lines. The tubes have cathodes 125 and 126 coupled by condensers 127 and 128 to outer metal cylinders 129 and 130, grids 131 and 132 connected to concentric inner metal cylinders 133 and 134, and anodes 135 and 136 connected by sliding contacts 137 and 138 to axially movable metal rods 139 and 140. The rods 139 and 140 are fixed to tuning disks 141 and 142 having flanges 143 and 144 capacity-coupled to the cylinders 129 and 130. The tuning of the cavities is varied by moving the rods 139 and 140 in and out.

The transmitter oscillator 118 is driven by a pulser 145 connected to the rod 139 and applying pulse voltages 146 to the anode 135 at the desired repetition rate, causing corresponding pulses of radio frequency oscillations 147. The transmitter oscillations are picked up by a loop 148 in the anode grid cavity and connected to the transmission line 120. The transmitted pulse, upon reaching the junction of the transmission lines 120 and 121, divides, part flowing to the antenna 122, and the remainder flowing along the transmission line 121 and driving the grid 132 of the receiver tube 124 to grid current. By means of a grid leak 149 connected between the grid 132 and cathode 126, the tube 124 is caused to saturate, thus effectively short circuiting the receiver end of the transmission line 121. The transmission line 121 is a quarter wavelength transmission line, i. e., a transmission line having an electrical length equal to an odd number of quarter wavelengths at the transmitter frequency. Upon shorting the receiver end of the transmission line 121 the junction with the transmission line 120 accordingly presents high impedance which limits the flow along the transmission line 121 so that the greater part of the transmitted pulse is delivered to the antenna.

During the intervals between the transmitted pulses, reflections from the object to be located are picked up by the antenna and conducted through the transmission line 121 to the grid 132 of the tube 124. Because the transmitter oscillator 118 is not conducting at this time, the impedance of the transmission line 120 can be made to look high at the junction of the transmission lines 120 and 121 so that the greater part of the reflection will flow to the receiver.

The receiver is driven by a quench oscillator 150 generating a sine wave voltage which, when added to a bias voltage, periodically applies a voltage to the anode 136 sufficient to start and quench a very weak oscillation at the transmitted frequency. The quench frequency is such that the period of quench voltage is of the same order as the duration of the transmitted pulse (one half the duration of the transmitted pulse in the construction illustrated). The maximum voltage applied by the quench oscillator is relatively low compared to the voltage applied to the transmitter and is selected with reference to the quench frequency so that the oscillation of the receiver does not build up to any appreciable magnitude. The minimum voltage of the quench oscillator is sufficient to quench the receiver oscillation quickly. In the construction illustrated the pulse voltage applied to the transmitter is of the order of 10,000 volts and the maximum voltage of the quench oscillator is of the order of 400 volts.

The operation of the receiver oscillator is illustrated in Fig. 7 where the reflected pulse conducted to the grid 132 is indicated at *a*, the quench voltage is indicated at *b*, and the receiver oscillation is indicated at *c*. Between the reflected pulses the receiver oscillation builds up to the relatively small amplitudes indicated at 151 (similar to 21 in Fig. 1) which have varying maximums determined by the noise level. The reflected pulses fed to the grid 132 of the receiver act in the same manner as the priming pulses in the previously described construction and cause the receiver oscillation to build up to the relatively large amplitudes 152.

The receiver oscillation is picked up by a loop 153 in the anode-grid cavity and is fed through a concentric transmisison line 154 to a loop 155 in the anode-cethode cavity of a lighthouse diode 156. The diode 156 has a cathode 157 coupled by a condenser 158 to an outer metal cylinder 159 and an anode 160 connected to a concentric metal rod 161. The anode-cathode cavity is tuned by a slideable metal ring 162 to the transmitter frequency so as to obtain the maximum energy transfer. The receiver oscillation is reproduced in the diode 156 and is rectified by the diode and conducted to a pulse amplifier 163. The noise level oscillations 151 appear in the pulse amplifier input as the relatively small peaks 164, and the reflection oscillations 152 appear as the larger peaks 165. The pulse amplifier preferably has the characteristic of amplifying only the low frequency components of the peaks 164 and 165 so that in the output the peaks 164 appear as ripples 166 and the peaks 165 appear as a single pulse 167. In Fig. 7 the output of the detector and pulse amplifier appear respectively at *d* and *e*. The output of the pulse amplifier is fed to a suitable display equipment 168 which synchronizes and displays the desired information.

The diode detector responds to the amplitude of the receiver oscillation and is not responsive to the voltage of the quench oscillator. This is important since the quench frequency is of the same order as the pulse frequencies, and if the detector were tuned to the quench frequency, the quench frequency would blank the received pulses.

In Figs. 8 and 9 is shown a crystal detector for replacing the lighthouse diode 156 of Fig. 6. In this construction a crystal 169 carried in a suitable holder 170 is arranged within the transmission line 154, one end of the holder being connected to the inner conductor of the transmission line and the other end of the holder being connected to a terminal 171 connected by condensers 172 to the outer conductor of the transmission line. The crystal rectifies the receiver oscillations, producing peaks 164 and 165 which are fed from the terminal 171 to the pulse amplifier 163, as in the Fig. 6 construction.

The frequency of the transmitter and receiver oscillators 118 and 119 varies linearly with the axial displacement of the rods 139 and 140 throughout the range of operation. It is therefore possible to gang the transmitter and receiver for tuning for single dial tuning, as indicated diagrammatically in Fig. 10. The ability to vary the transmitter and receiver frequency with a single dial enables the operator to change the frequency so as to avoid jamming.

In the arrangement shown in Fig. 10, a dial 173 drives screws 174 and 175 threaded into a support 176 and suitably connected to the rods 139 and 140. The screw 175 is driven from the screw 174 through gearing 177.

In preceding portions of the specification I have described certain circuit modifications in which a local source of priming oscillations is periodically pulsed. In particular, Fig. 5 illustrated such a system where the priming oscillator is pulsed in synchronism with the main oscillator. While such circuits employ the broad principles of supplying priming oscillations in accordance with my invention, I do not claim such modifications as my invention.

While I have shown particular embodiments of my invention, it will be understood that many modifications may be made without departing from the spirit thereof, and I contemplate by the appended claims to cover any such modifications as fall within the true spirit and scope of my invention.

What I claim as new and desire to secure by Letters Patent of the United States is:

1. The method of decreasing the time of build-up of radio frequency oscillation in an oscillator having a relatively long time of build-up during pulses of unidirectional operating potential, which comprises exciting the oscillator with a relatively weak resonant radio frequency voltage having the frequency at which the oscillator operates coincident with the pulses of operating voltage.

2. In a cavity resonator, means for exciting radio frequency oscillations therein in response to intermittent pulse voltages, and means for coupling into the resonator a radio frequency voltage coincident with said oscillations and of the same frequency, thereby to increase the rate of build-up of radio frequency oscillation under the pulse excitation.

3. In radio locating equipment, a receiver for pulses of radio waves comprising an oscillator coupled to receive pulses, means for energizing the oscillator with a unidirectional pulse voltage such that the coincidence with a received pulse causes a substantial difference in the oscillation, means for shifting the phases of the exciting pulse voltage into coincidence with a received pulse, and indicating means responsive to the oscillation for providing an indication of the coincidence of the exciting and received pulses.

4. In radio locating equipment, a receiver for pulses of radio waves comprising, an oscillator coupled to receive pulses, means to supply to the oscillator a unidirectional pulse of operating voltage of a duration and magnitude such that in the absence of a received pulse oscillations of but small amplitude are produced and upon coincidence of a pulse of operating voltage with a received pulse oscillations of much larger amplitude are produced, and indicating means responsive to the oscillation for providing an indication of the coincidence of the pulses of operating voltage and received pulses.

5. In radio locating equipment, a cavity resonator for connection with an antenna, means for exciting oscillation in the resonator by relatively wide unidirectional pulses for transmission and by relatively narrow unidirectional pulses for reception, the narrow pulses being such that the coincidence with a received signal causes a substantial change in the oscillation, and indicating means responsive to the oscillation.

6. In radio locating equipment, an oscillator for connection with an antenna, means for exciting the oscillator by short, high intensity, unidirectional pulses for transmission, means for exciting the oscillator intermediate the high intensity pulses at a lower intensity level such that an echo coupled into the oscillator causes a substantial change in oscillation, and indicating means responsive to the oscillation.

7. In radio locating equipment, a transmitter and receiver having an oscillator coupled to an antenna, means for pulsing the oscillator at the desired repetition rate for transmission with unidirectional pulses of an intensity such that the oscillation builds up to its full amplitude for a substantial part of the duration of the pulse, means for pulsing the oscillator intermediate the transmitted pulses with lower intensity unidirectional pulses such that the oscillation builds up to its full amplitude only in response to a coincident received echo signal.

8. In combination, in a system for receiving pulses of high frequency energy, a pulse receiver including an oscillator to which the received pulses are supplied and including means to supply to said oscillator pulses of unidirectional operating potential to render said oscillator periodically operative to generate high frequency oscillations, said high frequency oscillations being modified in response to said received pulses to have greater intensity during said received pulses than between said received pulses, and means responsive to the oscillations produced for providing an indication of the coincidence of a pulse of operating potential and a received signal pulse.

9. In combination, an electron discharge oscillator, means to supply to said oscillator unidirectional operating potential in pulses of such intensity that oscillations build up in said oscillator during said pulses after appreciable delay, and means to decrease said delay, said means comprising means to supply to said oscillator priming oscillations of the frequency of said oscillations to be built-up and of intensity less than the intensity of the oscillations to be built up.

10. The combination, in a pulse receiving system, of an electron discharge oscillator, means to supply to said oscillator pulses of unidirectional operating potential recurring at the frequency of pulses to be received, said electron discharge oscillator being inoperative between said pulses of operating potential and operating to initiate the build-up of oscillations during said pulses of operating potential having the frequency of said oscillations to be received, means to supply the received oscillations to said oscillator to increase the intensity to which said oscillations build up during said pulses of operating potential, and means controlled by said increased intensity of said oscillations.

11. In an echo apparatus, a normally inoperative electron discharge oscillator, an antenna coupled thereto, means to supply unidirectional control pulses thereto of long duration for transmission and short duration for reception, said oscillator operating to build up oscillations of relatively weak intensity to oscillations of strong intensity with delay and said short pulses having intensity substantially equal to said delay, said strong intensity oscillations being radiated by said antenna and received thereby after reflection from a remote object to increase the intensity of oscillations built up in said oscillator during said short pulses, and means to phase said short pulses for coincidence with echoes of said long pulses.

12. In combination, a normally inoperative high frequency electron discharge oscillator, means to supply to said oscillator relatively low frequency pulses of unidirectional control potential to render said oscillator periodically operative, and means to supply to said oscillator oscillations of relatively weak intensity and of the same high frequency at which said oscillator operates to stabilize the build-up of oscillations in said oscillator at the beginning of each pulse.

13. The combination, in a receiver, of a normally inoperative electron discharge oscillator, means to supply to said oscillator pulses of unidirectional control potential to render said oscillator operative, said oscillator operating in the absence of received oscillations to generate oscillations having the frequency of oscillations to be received but of weak intensity, means to supply received oscillations to said oscillator during said pulses to prime said oscillator whereby said oscillator generates oscillations of much greater intensity, and a detector for the generated oscillations.

RICHARD C. JENSEN.

REFERENCES CITED

The following references are of record in the file of this patent:

UNITED STATES PATENTS

| Number | Name | Date |
|---|---|---|
| 1,924,174 | Wolff | Aug. 29, 1933 |
| 2,051,372 | Farnsworth | Aug. 18, 1936 |
| 2,103,362 | Hansell | Dec. 28, 1937 |
| 2,177,061 | Gerhard | Oct. 24, 1939 |
| 2,181,568 | Kotowski et al. | Nov. 28, 1939 |
| 2,189,549 | Hershberger | Feb. 6, 1940 |
| 2,203,004 | West | June 4, 1940 |
| 2,252,442 | Schlesinger | Aug. 12, 1941 |
| 2,309,525 | Mohr | Jan. 26, 1943 |
| 2,333,688 | Shepard | Nov. 9, 1943 |
| 2,392,380 | Varian | Jan. 8, 1946 |
| 2,416,367 | Young | Feb. 25, 1947 |
| 2,418,121 | Hoffman | Apr. 1, 1947 |

Certificate of Correction

Patent No. 2,498,495

February 21, 1950

RICHARD C. JENSEN

It is hereby certified that errors appear in the printed specification of the above numbered patent requiring correction as follows:

Column 3, line 12, for "occillation" read *oscillation*; column 8, line 19, for the reference numeral "177" read *117*;

and that the said Letters Patent should be read with these corrections therein that the same may conform to the record of the case in the Patent Office.

Signed and sealed this 25th day of July, A. D. 1950.

[SEAL]

THOMAS F. MURPHY,
*Assistant Commissioner of Patents.*